(No Model.) 2 Sheets—Sheet 1.

J. M. BARNES.
CLOTH MEASURING MACHINE.

No. 243,831. Patented July 5, 1881.

Witnesses
M. M. Lacey
A. Parker

Inventor
James M. Barnes
By R. S. & A. P. Lacey Att'ys.

(No Model.) 2 Sheets—Sheet 2.

J. M. BARNES.
CLOTH MEASURING MACHINE.

No. 243,831. Patented July 5, 1881.

Witnesses:
M. M. Lacey
A. Parker

Inventor
James M. Barnes
By R. S. & A. Lacey
Attys.

UNITED STATES PATENT OFFICE.

JAMES M. BARNES, OF PALMER, ILLINOIS.

CLOTH-MEASURING MACHINE.

SPECIFICATION forming part of Letters Patent No. 243,831, dated July 5, 1881.

Application filed March 31, 1881. (No model.)

*To all whom it may concern:*

Be it known that I, JAMES M. BARNES, a citizen of the United States, residing at Palmer, in the county of Christian and State of Illinois, have invented certain new and useful Improvements in Cloth Bolters and Measurers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish an improved machine for winding cloth on or off a bolt and at the same time measuring the length of the web.

It consists in the construction and arrangement of the several parts hereinafter fully described, and pointed out in the claim.

Figure 1:
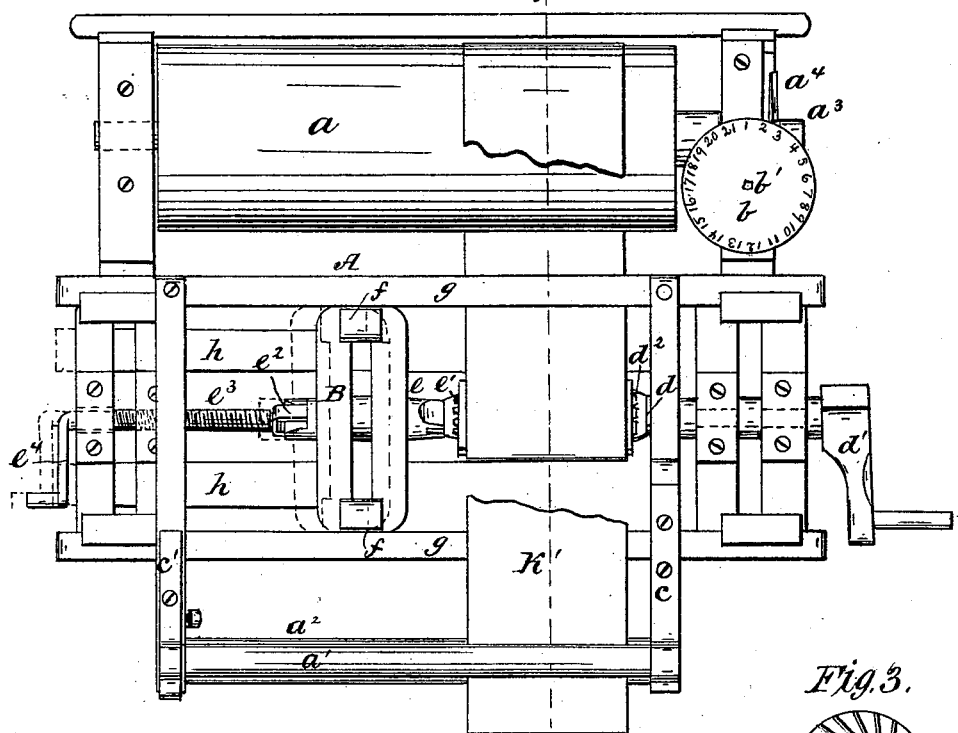
Figure 3:
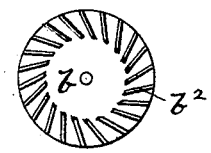
Figure 2:
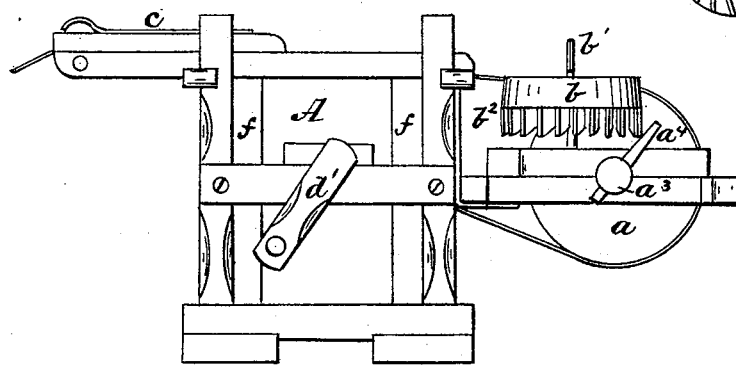
Figure 4:
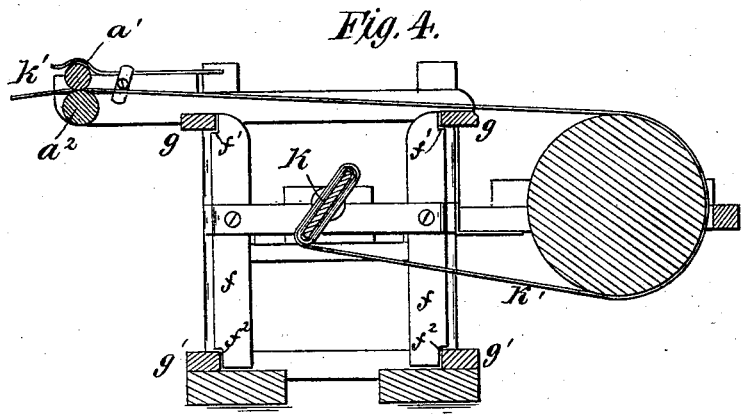
Figure 5:
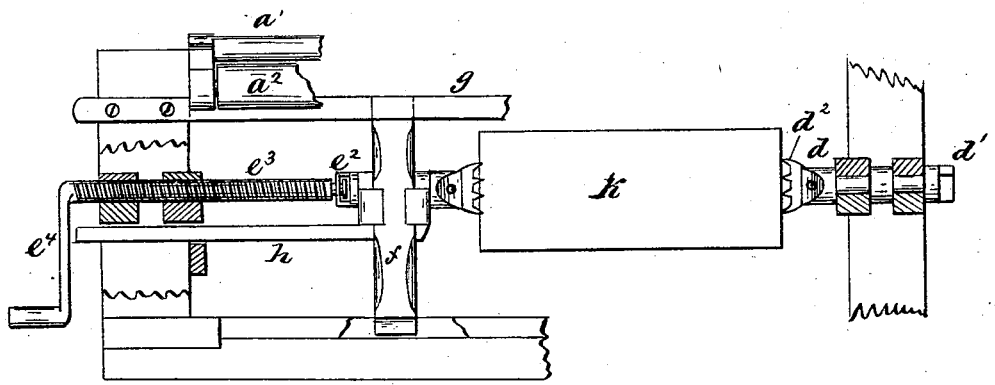
Figure 6:
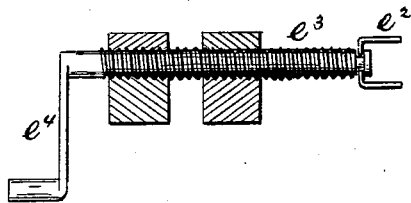

In the drawings, Figure 1 is a plan, and Fig. 2 an end elevation. Fig. 3 shows the under side of the index or enumerator wheel. Fig. 4 is a vertical section on line $x\,x$, Fig. 1; and Figs. 5 and 6 are partial or detail views.

A represents the frame on which are fixed the several parts of my invention. On one side of this frame I journal the measuring-roller $a$, and on the opposite side I journal the tension-rollers $a'\,a^2$. The measuring-roller $a$ is preferably constructed so that its circumference will measure just one yard; but it may be constructed to measure more or less than a yard, if desired. On the end of the shaft $a^3$ which projects outward from the frame A there is fixed a short arm, $a^4$, which, with each revolution of roller $a$, engages a tooth on the numerator-wheel and moves the latter one place forward.

$b$ is the numerator or index wheel, which is supported in its horizontal position by and revolves on the vertical shaft $b'$, which has its lower end fixed on the side bar of the frame $a$. On the under side of the wheel $b$ there are fixed a series of teeth, $b^2$, extending from the periphery inward, and are inclined to the radius of the wheel, so that when one of them is engaged by the end of the rotating arm $a^4$ the latter will push the wheel one place forward, and thus register a complete revolution of the roller $a$.

The upper tension-roller, $a'$, is preferably made of metal, and it is held in its bearings so that it can be easily removed when desired. Its ends are held down by spring-plates $c\,c'$, the latter of which is held by a single screw, so that it may be turned to one side and off the end of the roller. By turning the plate $c'$ as indicated, the roller can be lifted from its bearings. The plates $c\,c'$ can be made to bear hard or easy on the roller $a'$ by tightening or loosening the screws by which they are held. The tension of the rollers $a'\,a^2$ is thus increased or lessened.

Intermediately between the roller $a$ and the rollers $a'\,a^2$ there is journaled a head or stationary chuck, $d$, on the outer end of the shaft of which there is placed a crank, $d'$. On the inner end of the chuck there is fixed a series of short teeth, $d^2$.

$e$ is an adjustable chuck journaled in the adjustable frame B. Its inner end is provided with a row of teeth, $e'$, and on the outer end of its shaft there is fixed a swivel-plate, $e^2$, in which is swiveled the inner end of the set-screw $e^3$. The outer end of screw $e^3$ is held in a nut fixed immovably in the frame A. The screw is turned by a crank, $e^4$, and by it the frame B, with its chuck $e$, may be adjusted toward or away from the chuck $d$, so that the chucks may thus be arranged to hold a longer or a shorter board around which the cloth is wound.

The frame B is composed of suitable cross-bars held by uprights $f\,f$. The upper ends of the uprights are held between the cross-bars $g\,g$ of frame A, while the lower ends are provided with guide-notches, which rest on the corners of the cross-sills $g'\,g'$.

$h\,h$ are guide-bars, which have one of their ends fixed rigidly to the frame B, while their opposite ends pass through and slide in guide-slots in the frame A. The frame B, when constructed and adjusted in the frame A as hereinbefore described, will move back and forth with perfect steadiness, so that the chucks can be adjusted relatively to each other with the greatest ease and rapidity.

$k$ represents the cloth-board around which the web $k'$ is wound.

The operation of the device will be readily comprehended. One end of the board $k$ is placed on the teeth of chuck $d$, and the chuck $e$ is then moved by the screw $e^3$ so as to bring the teeth $e'$ to hold the opposite end of the board. The end of the web is then passed around roller $a$ from below and is carried to and passed between the rollers $a'$ $a^2$, as shown. If when the end of the web is carried around the roller $a$ it be brought to a mark vertical to the center of said roller, and then be drawn tight against the periphery, so that as it is drawn toward the rollers $a'$ $a^2$ it will cause the roller $a$ to revolve, the length of the cloth between the said roller $a$ and rollers $a'$ $a^2$ will be duly registered. But I find it more convenient to construct the machine and arrange the parts so that the length from the center of the chucks around the roller $a$ to the rollers $a'$ $a^2$ shall be integral parts or multiple of a yard—preferably one yard.

It will be seen that the cloth can be measured as rapidly as it can be drawn through the machine, either in winding it off or onto the board $k$.

In invoicing goods this device is invaluable by reason of the rapidity and certainty with which it does its work.

It will be seen that the periphery of the roll $a'$ lies against the periphery of the roll $a^2$, and is held firmly in position with capability of a vertical adjustment by the spring-boxes $c$ $c'$, so that any thickness of cloth may be measured by the machine. The end of the cloth, when passed between the rolls $a'$ $a^2$, will be held by the downward pressure of the upper roll, so that it will not drop back if the outer portion be cut off. The machine may thus be utilized for holding cloth from which lengths purchased by customers are to be cut.

The arrangement of the bolt-holding chucks below the plane of the measuring and retaining rolls and in the middle of the machine places the several parts of the operating mechanism and the cloth in compact space, and provides a means whereby a yard or more of the cloth may be stretched and held for inspection.

Having thus described my invention, what I claim, and desire to secure by Letters Patent, is—

The combination, substantially as hereinbefore set forth, of the frame A, the chuck $d$, and the adjustable chuck $e$, arranged near the middle of the frame, the roll $a$, journaled at one side of the frame, and the rolls $a'$ $a^2$, journaled at the opposite side thereof and above the plane of the chucks, the roll $a'$ being adjustable vertically and bearing on the periphery of the under fixed roll, $a^2$, substantially as set forth.

In testimony whereof I affix my signature, in presence of two witnesses, on this 22d day of March, A. D. 1881.

JAMES M. BARNES.

Witnesses:
THOMAS C. DODSON,
THOMAS VICKERS.